US012587423B2

(12) United States Patent
Kim et al.

(10) Patent No.: US 12,587,423 B2
(45) Date of Patent: Mar. 24, 2026

(54) METHOD AND APPARATUS FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Yeongjun Kim, Seoul (KR); Sangrim Lee, Seoul (KR); Bonghoe Kim, Seoul (KR); Kyungho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/711,076

(22) PCT Filed: Nov. 18, 2021

(86) PCT No.: PCT/KR2021/016976
§ 371 (c)(1),
(2) Date: May 16, 2024

(87) PCT Pub. No.: WO2023/090481
PCT Pub. Date: May 25, 2023

(65) Prior Publication Data
US 2025/0007764 A1 Jan. 2, 2025

(51) Int. Cl.
*H04L 27/26* (2006.01)

(52) U.S. Cl.
CPC ................................. *H04L 27/2614* (2013.01)

(58) Field of Classification Search
CPC .............. H04L 27/2614; H04L 27/262; H04L 27/2618; H04L 27/26; H04L 27/2615; H04L 27/2617; H04L 27/2621; H04L 27/2623; H04L 27/2624; H04L 27/2626;
H04L 27/2627; H04L 27/26265; H04L 27/2628; H04L 27/263; H04L 27/2634; H04L 27/26362; H04L 27/2639
See application file for complete search history.

(56) References Cited

U.S. PATENT DOCUMENTS

| | | | |
|---|---|---|---|
| 2020/0127801 A1 | 4/2020 | Sengupta et al. | |
| 2021/0266875 A1* | 8/2021 | Namgoong | ........... H04W 84/02 |
| 2023/0009343 A1* | 1/2023 | Abdelhafiz | .............. H04B 1/10 |

FOREIGN PATENT DOCUMENTS

| | | |
|---|---|---|
| EP | 3211846 | 8/2017 |
| KR | 1020100094317 | 8/2010 |
| KR | 101067644 | 9/2011 |
| KR | 101827754 | 3/2018 |

OTHER PUBLICATIONS

PCT International Application No. PCT/KR2021/016976, International Search Report dated Aug. 4, 2022, 6 pages.

* cited by examiner

*Primary Examiner* — Khanh C Tran
(74) *Attorney, Agent, or Firm* — LEE, HONG, DEGERMAN, KANG & WAIMEY

(57) ABSTRACT

The present invention relates to a wireless communication system and, particularly, to a method and an apparatus therefor, the method comprising the steps of: inputting, into an artificial neural network, (1) a data modulation symbol, (2) information for generating a reference signal sequence, and (3) PAPR margin information, so as to output a complex sequence from the artificial neural network in a frequency domain; generating an OFDM symbol by applying the inverse Fourier transform to the complex sequence; and transmitting the OFDM symbol.

12 Claims, 10 Drawing Sheets

FIG. 8

B : Bit information
X : QAM data symbols
A : information for pilot sequence generation
Pg : PAPR margin (target PAPR)
P : measured PAPR
C : decoded / detected bits BO : back-off
PA : Power Amplifier L1 : Loss function for PAPR
L2 : Loss function for bit information L = L2 + pL1 : total loss

FIG. 12

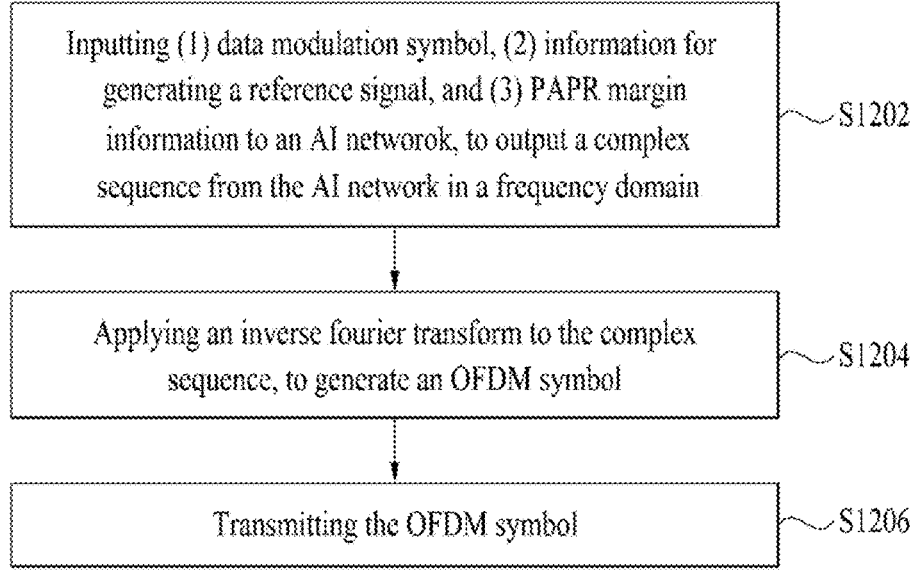

Inputting (1) data modulation symbol, (2) information for generating a reference signal, and (3) PAPR margin information to an AI networok, to output a complex sequence from the AI network in a frequency domain ~S1202

Applying an inverse fourier transform to the complex sequence, to generate an OFDM symbol ~S1204

Transmitting the OFDM symbol ~S1206

FIG. 13

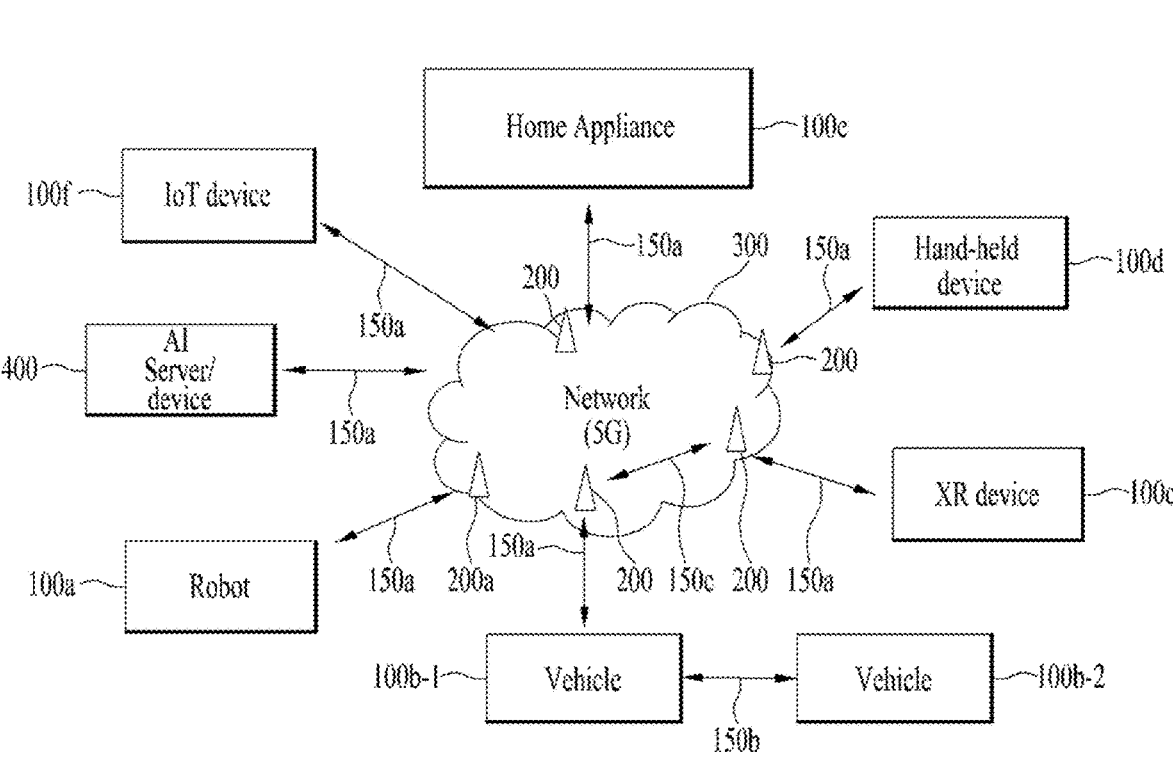

1

Home Appliance ~100e

IoT device ~100f

Hand-held device ~100d

AI Server/ device ~400

Network (5G)

XR device ~100c

Robot ~100a

Vehicle ~100b-1

Vehicle ~100b-2

METHOD AND APPARATUS FOR TRANSMITTING/RECEIVING WIRELESS SIGNAL IN WIRELESS COMMUNICATION SYSTEM

CROSS-REFERENCE TO RELATED APPLICATION(S)

This application is the National Stage filing under 35 U.S.C. 371 of International Application No. PCT/KR2021/016976, filed on Nov. 18, 2021, contents of which are all incorporated by reference herein in its entirety.

TECHNICAL FIELD

The disclosure relates to a wireless communication system, and more particularly to a method and device for transmitting and receiving a wireless signal.

BACKGROUND

Wireless communication systems have been widely deployed to provide various types of communication services such as voice and data, and there has been a significant increase in efforts to integrate artificial intelligence (AI) into communication systems. The approaches for integrating AI may be broadly categorized into communications for AI (C4AI), which aims to advance communication technology to support AI, and AI for communications (AI4C), which uses AI to improve communication performance. In the AI4C field, there are attempts to increase design efficiency by replacing a channel encoder/decoder with an end-to-end autoencoder. In the C4AI field, there is a method of updating a common prediction model while protecting personal information by sharing only the weights or gradients of an AI model with a server without sharing raw data based on federated learning, which is one type of distributed learning. Additionally, there is a method of distributing the loads of a device, a network edge, and a cloud server based on split inference.

SUMMARY

An objective of the disclosure is to provide a method of effectively performing a procedure of transmitting and receiving a wireless signal and a device therefor.

It will be appreciated by persons skilled in the art that the objects that could be achieved with the disclosure are not limited to what has been particularly described hereinabove and the above and other objects that the disclosure could achieve will be more clearly understood from the following detailed description.

In a first aspect of the present disclosure, provided herein is a method of transmitting a wireless signal by a transmitting device in a wireless communication system. The method may include: inputting (1) a data modulation symbol, (2) information for generating a reference signal sequence, and (3) peak-to-average power ratio (PAPR) margin information into an artificial neural network, to output a complex sequence in a frequency domain through the artificial neural network; generating an orthogonal frequency division multiplexing (OFDM) symbol by applying an inverse Fourier transformation to the complex sequence; and transmitting the OFDM symbol.

In a second aspect of the present disclosure, provided herein is a transmitting device used in a wireless communication system. The transmitting device may include: at least one radio frequency (RF) unit: at least one processor; and at least one computer memory operably connected to the at least one processor and configured to, when executed, cause the at least one processor to perform operations. The operations may include: inputting (1) a data modulation symbol, (2) information for generating a reference signal sequence, and (3) PAPR margin information into an artificial neural network, to output a complex sequence in a frequency domain through the artificial neural network; generating an OFDM symbol by applying an inverse Fourier transformation to the complex sequence; and transmitting the OFDM symbol.

In a third aspect of the present disclosure, provided herein is an apparatus for a transmitting device. The apparatus may include: at least one processor; and at least one computer memory operably connected to the at least one processor and configured to, when executed, cause the at least one processor to perform operations. The operations may include: inputting (1) a data modulation symbol, (2) information for generating a reference signal sequence, and (3) PAPR margin information into an artificial neural network, to output outputting a complex sequence in a frequency domain through the artificial neural network; generating an OFDM symbol by applying an inverse Fourier transformation to the complex sequence; and transmitting the OFDM symbol.

In a fourth aspect of the present disclosure, provided herein is a computer-readable storage medium including at least one computer program that, when executed, causes at least one processor to perform operations. The operations may include: inputting (1) a data modulation symbol, (2) information for generating a reference signal sequence, and (3) PAPR margin information into an artificial neural network, to output a complex sequence in a frequency domain through the artificial neural network; generating an OFDM symbol by applying an inverse Fourier transformation to the complex sequence; and transmitting the OFDM symbol.

In a fifth aspect of the present disclosure, provided herein is a method of receiving a wireless signal by a receiving device in a wireless communication system. The method may include: receiving an OFDM symbol; generating a complex sequence in a frequency domain by applying a Fourier transformation to the OFDM symbol; and inputting (1) the complex sequence, (2) information for generating a reference signal sequence, and (3) PAPR margin information into an artificial neural network, to output a data modulation symbol through the artificial neural network.

In a sixth aspect of the present disclosure, provided herein is a receiving device used in a wireless communication system. The receiving device may include: at least one RF unit; at least one processor; and at least one computer memory operably connected to the at least one processor and configured to, when executed, cause the at least one processor to perform operations. The operations may include: receiving an OFDM symbol; generating a complex sequence in a frequency domain by applying a Fourier transformation to the OFDM symbol; and inputting (1) the complex sequence, (2) information for generating a reference signal sequence, and (3) PAPR margin information into an artificial neural network, to output a data modulation symbol through the artificial neural network.

Preferably, the PAPR margin information may include a ratio of (i) maximum transmit (Tx) power of the transmitting device to (ii) Tx power required for signal transmission.

Preferably, the PAPR margin information may be shared with a receiving device.

Preferably, a loss function used in training of the artificial neural network may include the following: $L = L2 + \rho L1$, where $\rho$ represents a hyperparameter, L1 represents a PAPR-related loss, and L2 represents a bit error rate related (BER-related) loss.

Preferably, $\rho$ may be a positive value.

According to the disclosure, a wireless signal may be transmitted and received efficiently in a wireless communication system.

It will be appreciated by persons skilled in the art that the effects that may be achieved with the disclosure are not limited to what has been particularly described hereinabove and other advantages of the disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 8 illustrates a conventional peak-to-average power ratio (PAPR) reduction method.

FIG. 12 illustrates a signal transmission method according to an example of the present disclosure.

FIGS. 13 to 16 illustrate a communication system 1 and wireless devices, which are applied to the disclosure.

DETAILED DESCRIPTION

Embodiments of the disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the disclosure, for simplicity, this technology will be referred to as NR (New Radio or New RAT).

For the sake of clarity, 3GPP NR is mainly described, but the technical idea of the disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
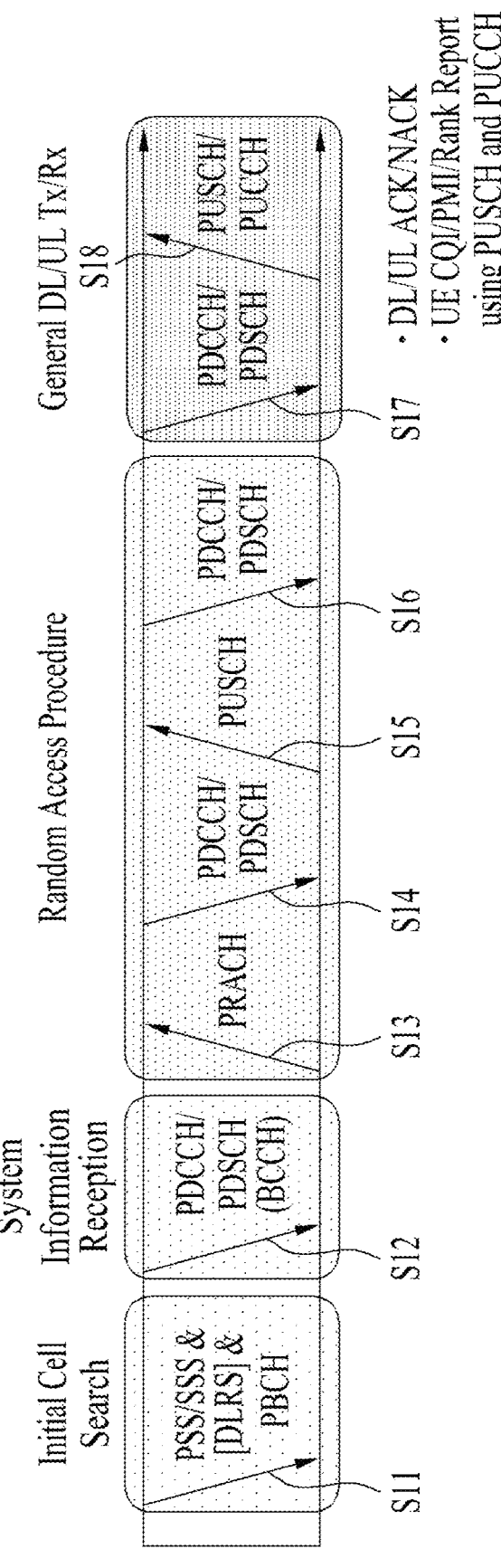
FIG. 1 illustrates physical channels used in a 3rd generation partnership project (3GPP) system as an exemplary wireless communication systems and a general signal transmission method using the same.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE receives synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
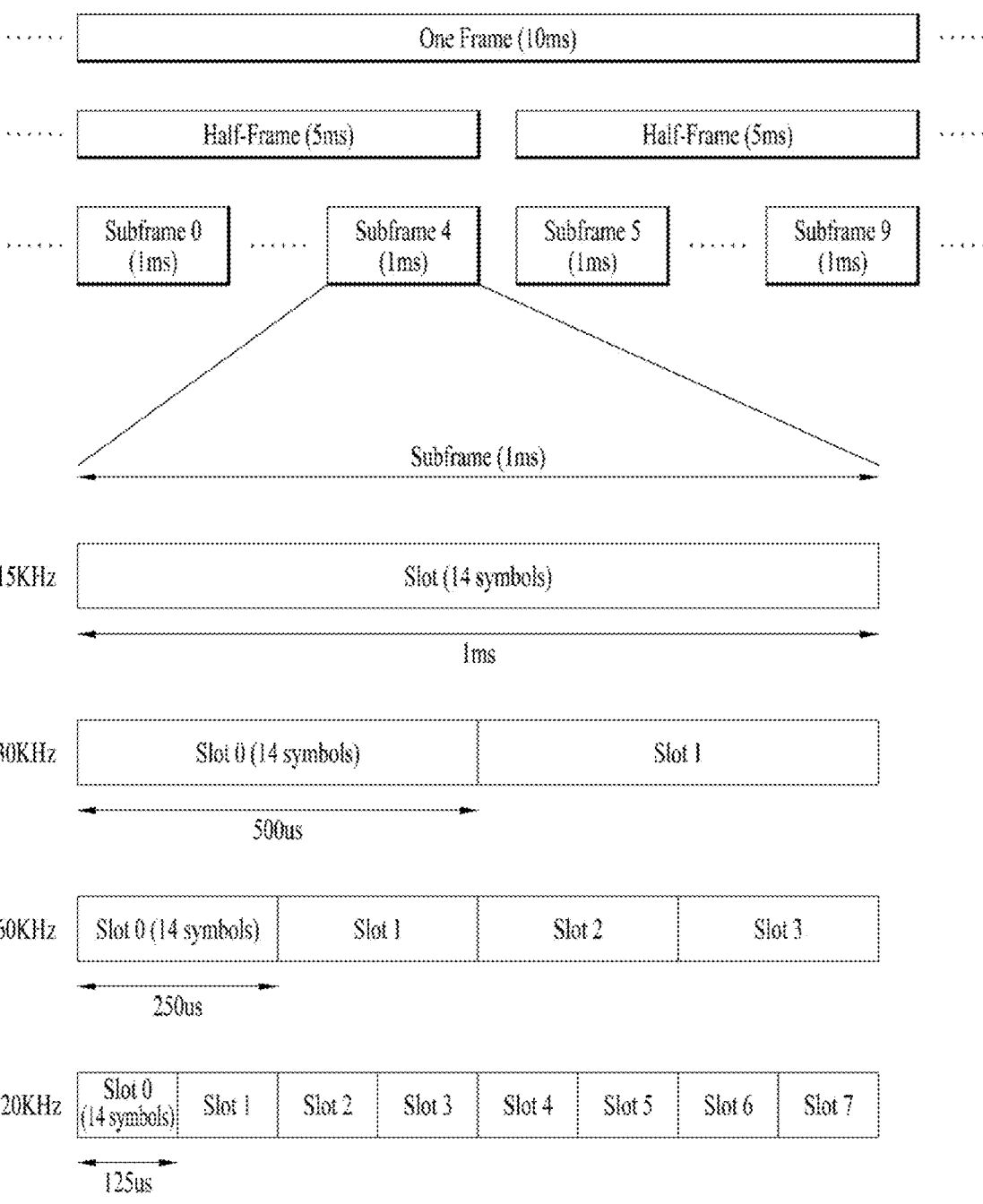
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 orthogonal frequency division multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in slot
* $N^{frame, u}_{slot}$: Number of slots in frame
* $N^{subframe, u}_{slot}$: Number of slots in subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely an example. The number of subframes, the number of slots, and the number of symbols in a frame may vary.

In the NR system, different OFDM numerologies (e.g., SCSs) may be configured for a plurality of cells aggregated for one UE. Accordingly, the (absolute time) duration of a time resource including the same number of symbols (e.g., a subframe (SF), slot, or TTI) (collectively referred to as a time unit (TU) for convenience) may be configured to be different for the aggregated cells. A symbol may be an OFDM symbol (or CP-OFDM symbol) or an SC_FDMA symbol (or a discrete Fourier transform-spread-OFDM (DFT-s-OFDM) symbol).

Figure 3:
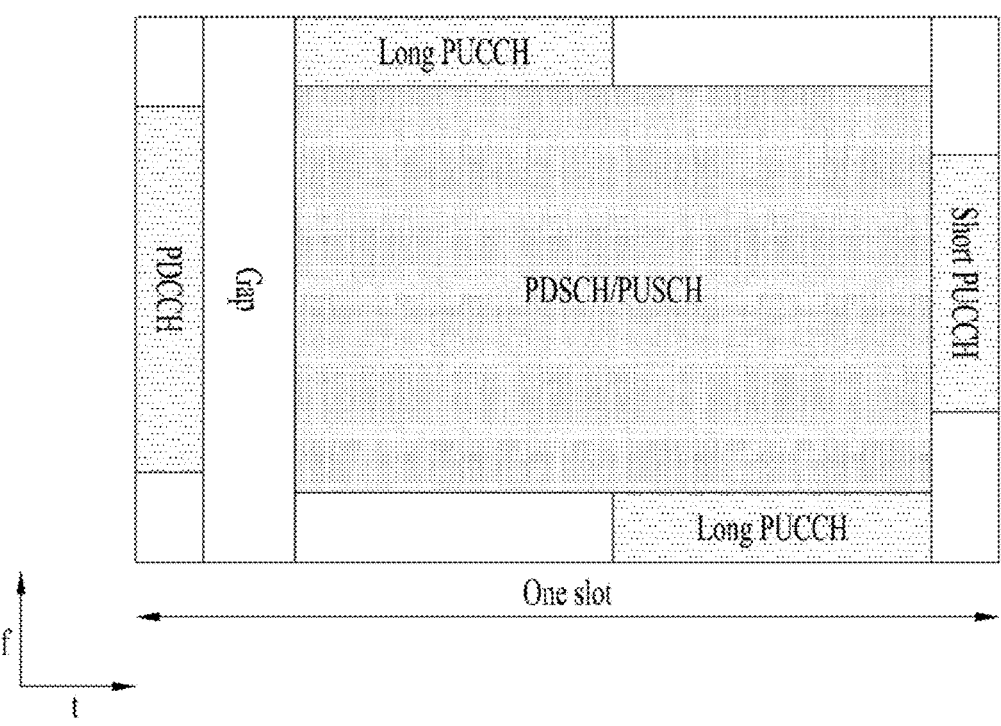
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
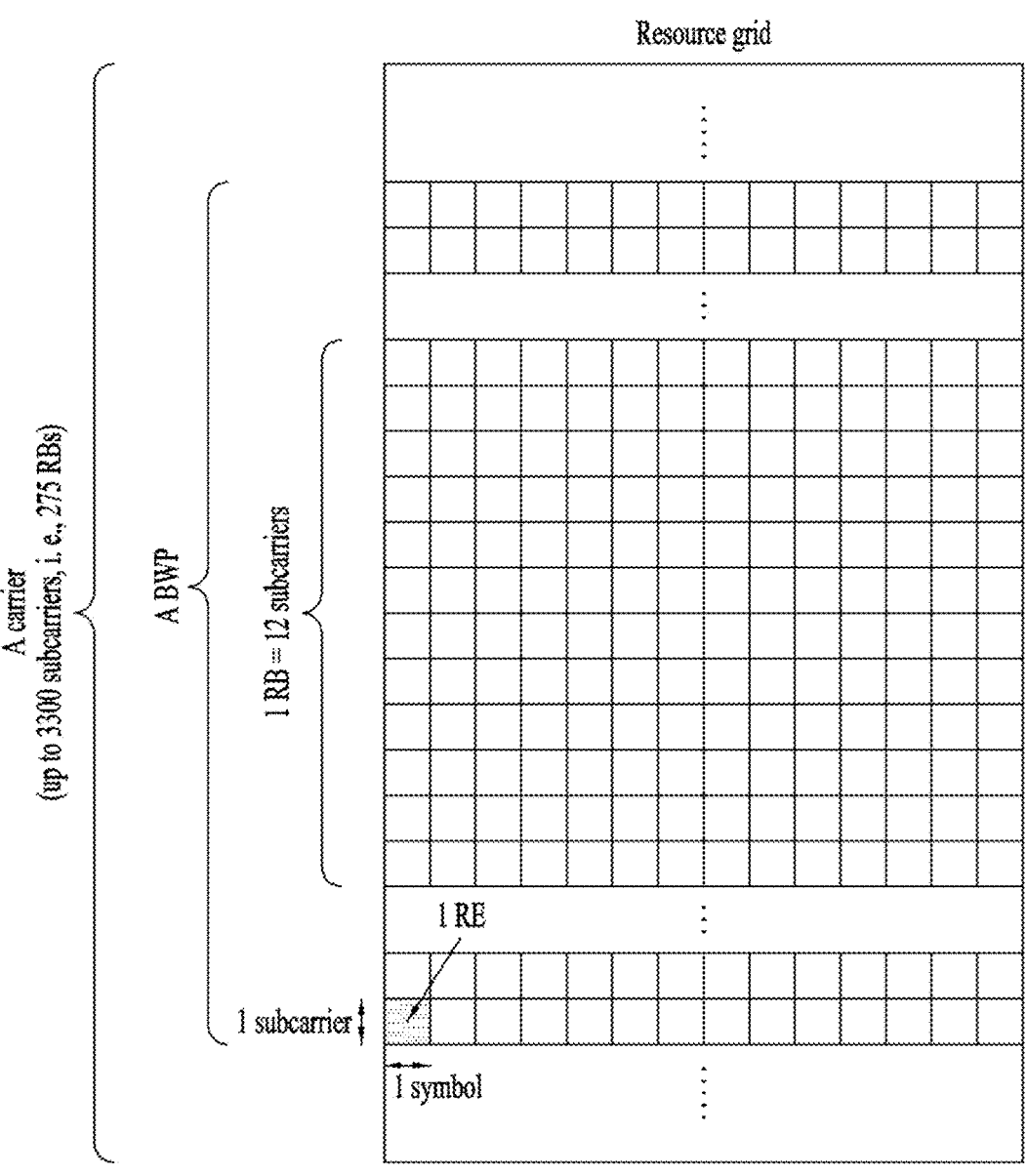
FIG. 4 illustrates mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols of a slot may be used for a DL control channel (e.g., PDCCH) (hereinafter, referred to as a DL control region), and the last M symbols of the slot may be used for a UL control channel (e.g., PUCCH) (hereinafter, referred to as a UL control region). Each of N and M is an integer equal to or larger than 0. A resource area (referred to as a data region) between the DL control region and the UL control region may be used for transmission of DL data (e.g., PDSCH) or UL data (e.g., PUSCH). A guard period (GP) provides a time gap for switching between a transmission mode and a reception mode at the BS and the UE. Some symbol at the time of switching from DL to UL may be configured as a GP.

The PDCCH carries downlink control information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., radio network temporary identifier (RNTI)) according to the owner or usage of the PDCCH. For example, if the PDCCH is for a specific UE, the CRC will be masked with a UE identifier (e.g., cell-RNTI (C-RNTI)). If the PDCCH is for paging, the CRC will be masked with a paging-RNTI (P-RNTI). If the PDCCH is for system information (e.g., a system information block (SIB)), the CRC will be masked with a system information RNTI (SI-RNTI). If the PDCCH is for a random access response, the CRC will be masked with a random access-RNTI (RA-RNTI).

Figure 5:
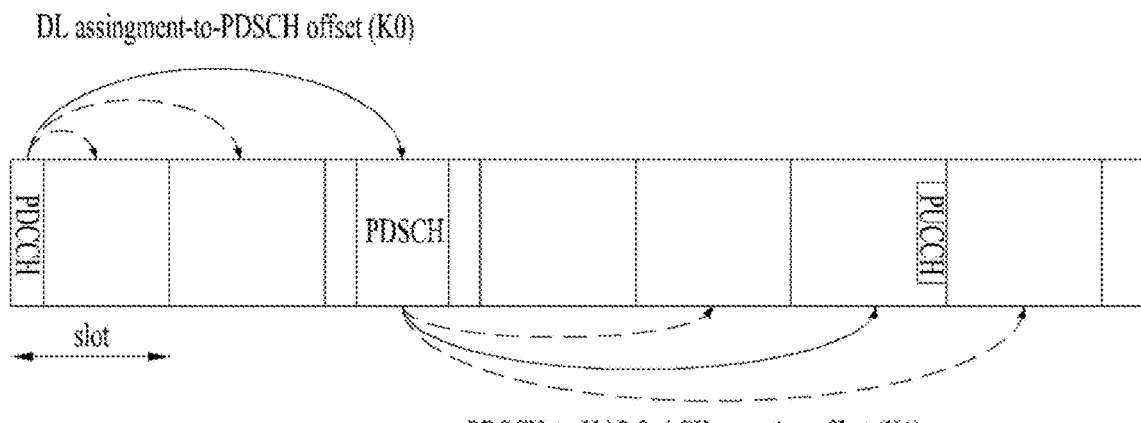
FIG. 5 illustrates a physical downlink shared channel (PDSCH) transmission process.

FIG. 5 illustrates an exemplary PDSCH transmission process. Referring to FIG. 5, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g., OFDM symbol index) and length (e.g., the number of OFDM symbols) of the PDSCH in a slot PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates PUCCH resource used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Figure 6:
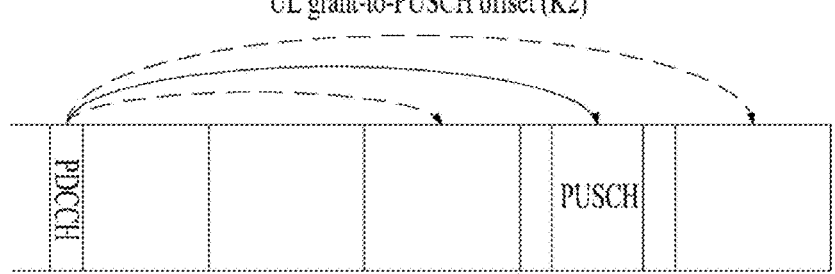
FIG. 6 illustrates a physical uplink shared channel (PUSCH) transmission process.

FIG. 6 illustrates an exemplary PUSCH transmission process. Referring to FIG. 6, the UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB. When PUCCH transmission time and PUSCH transmission time overlaps, UCI can be transmitted via PUSCH (PUSCH piggyback).

Embodiment: Radio Signals Based on a Neural Network

The 3GPP has worked on standardization of a 5G system called new RAT (hereafter, NR), and discussion is underway on a 6G system as a successor to the 5G system.

The 6G system is aimed at (i) very high data rates per device, (ii) a very large number of connected devices, (iii) global connectivity, (iv) very low latency, (v) lower energy consumption for battery-free IoT devices, (vi) ultra-reliable connectivity, and (vii) connected intelligence with machine learning capabilities. The vision of the 6G system may be four aspects such as intelligent connectivity, deep connectivity, holographic connectivity, and ubiquitous connectivity, and the 6G system may fulfill the requirements as listed in Table 3.

TABLE 3

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

One of new techniques that will be introduced in the 6G system is artificial intelligence (AI). The 4G system does not involve AI, and the 5G system will have partial or very limited AI support. However, in the 6G system, AI may be fully supported for automation. Advances in machine learning will create a more intelligent network for real-time communications in 6G. The introduction of AI in communications may streamline and improve real-time data transmission. AI may use numerous analytics to determine how complex target tasks are to be performed. Time-consuming tasks such as handover, network selection, and resource scheduling may be performed instantly by using AI. AI may also play an important role in M2M, machine-to-human, and human-to-machine communications.

In recent years, there have been attempts to integrate AI with wireless communication systems, mainly focusing on the application layer, the network layer, and especially application of deep learning to wireless resource management and allocation. However, this research is increasingly moving to the MAC layer and the PHY layer, and there are attempts to combine deep learning with wireless transmission, especially at the PHY layer. AI-driven PHY layer transmission means that underlying signal processing and communication mechanisms are based on AI drivers rather than traditional communication frameworks. For example, it may include deep learning-based channel coding and decoding, deep learning-based signal estimation and detection, deep learning-based MIMO mechanisms, AI-based resource scheduling and allocation, and so on.

Figure 7:
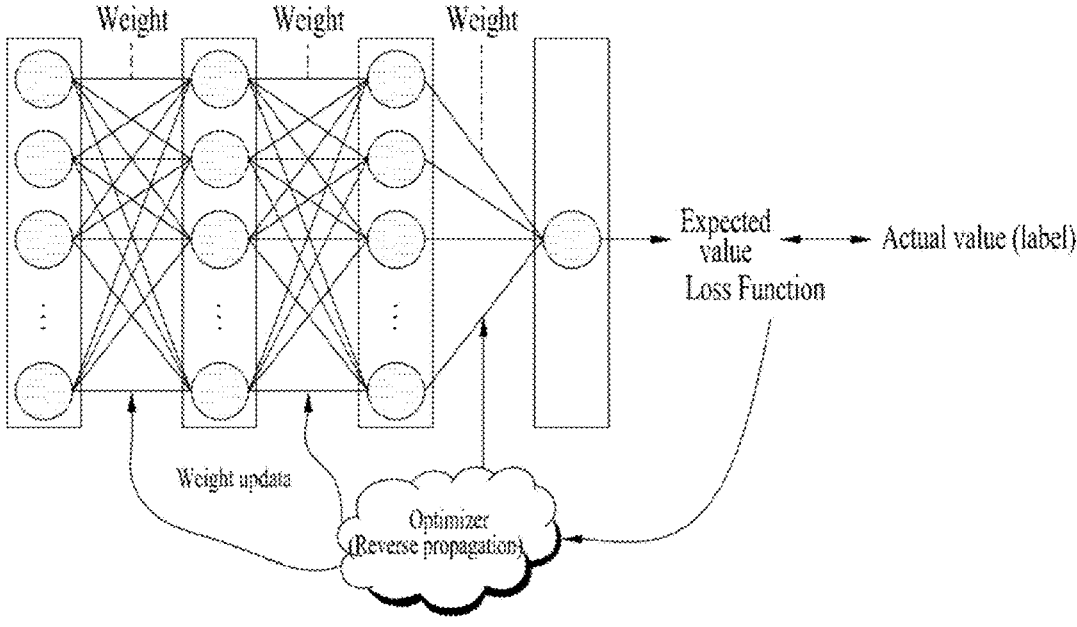
FIG. 7 illustrates a process for training a neural network.
Figure 8:
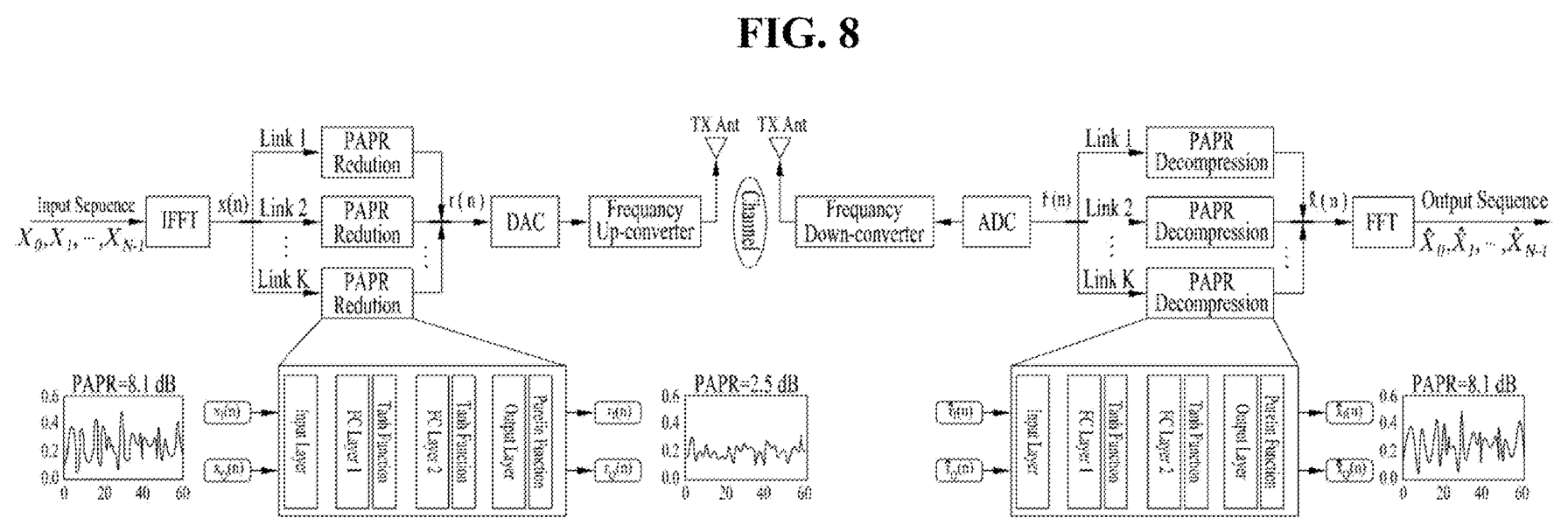

FIG. 7 illustrates an exemplary machine learning process based on a neural network (NN). In general, the machine learning process can proceed as follows: (1) constructing a model by selecting an algorithm suitable for a problem to be solved, (2) training a model with training data, and (3) validating the model with test data. Training the model with training data involves computing parameters (e.g., weights) of each layer constituting an AI neural network (simply, NN). Referring to FIG. 8, the model may be trained by comparing a predicted value of the NN with an actual value (e.g., label) and updating the weights of the NN in a direction that minimizes an error between the predicted value and the actual value. The error between the predicted value and the actual value is calculated using a loss function, and the weights may be updated through a backpropagation process based on the loss function. A backpropagation algorithm used in the NN is divided into a forward pass, which involves computing the weights of each layer from the input to the output, and a backward pass, which involves traversing back in the opposite direction of the forward pass and recalculating to adjust the existing weights. Once the forward and backward pass processes are completed for entire data, it may be considered that the training of the model is completed. The model may be validated based on the weights (hereinafter referred to as a weight set) computed for each layer up to the current point in time.

For AI-based DL transmission, a DL training process is necessary. In this case, considered parameters may be variously defined depending on the objectives of the system. Typically, performance metrics such as a bit error rate (BER) or peak to average power ratio (PAPR), which are key performance indicators in communication systems, may also be considered as important performance metrics for AI-based DL transmission and systems therefor.

In OFDM communication systems, the following methods: clipping, filtering, tone reservation, pilot signal design, and subcarrier allocation may be considered for PAPR reduction. However, these methods may reduce the PAPR or mitigate the impact thereof to enhance performance, but the methods are not optimized for the BER in consideration of the PAPR.

The BER optimization has a problem in simultaneously optimizing pilot signal design for channel estimation, channel estimation, signal detection algorithms, and so on. Before the application of the NN, the optimization for each module or a combination of some modules is performed for the BER optimization. However, in communication systems where the NN is applied, the BER may be optimized by considering all modules.

The NN system has the advantage of solving or optimizing problems based on non-linearity, which are difficult to solve in the prior art. In this case, optimization may be performed considering two performance metrics with different properties. For example, in conventional communication systems, to optimize two performance metrics considered in one system such as the BER and PAPR, each is optimized separately and independently reflected in the system. However, in the NN system, the BER and PAPR may be considered simultaneously for the entire system to resolve a single optimization problem.

FIG. 8 illustrates a conventional NN-based PAPR reduction method. Referring to FIG. 8, according to the conventional method, an NN is applied to reduce a PAPR in the time domain after an inverse fast Fourier transform (IFFT) (see the PAPR reduction block). The PAPR reduction block may consist of four layers: one input layer, two fully connected (FC) layers, and one output layer. In the FC layers, a weight matrix and a bias matrix are applied to input values, and an activation function (e.g., Tanh function) may be applied to the weighted sum of the input values. For example, assuming the inputs and outputs of the FC layer are denoted as $x_{FC}$ and $y_{FC}$ respectively, the operation of the FC layer may be represented as $y_{FC}=f_{FC}(w*x_{FC}+b)$, where w represents the weight matrix, b represents the bias matrix, and $f_{FC}( )$ denotes the activation function.

In the system shown in FIG. 8, the loss function is defined as follows.

$$l(\theta) = \alpha_1 l_1(\theta) + \alpha_2 l_2(\theta) + l_3(\theta) \qquad \text{[Equation 1]}$$

In Equation 1, $\alpha_1$ and $\alpha_2$ represent hyperparameters. In addition, $l_1(\theta)$ represents the loss function related to PAPR reduction, $l_2(\theta)$ represents the loss function related to out-of-band spectral spreading minimization, and $l_3(\theta)$ represents the loss function related to BER reduction.

Each loss function may be defined as follows.

$$l_1(\theta) = |PAPR[r(n)] - PAPR_g| \qquad \text{[Equation 2]}$$

In Equation 2, $PAPR_g$ represents a target PAPR.

$$l_2(\theta) = \frac{\sum_{Upper\_channel}|FFT(r(n))|^2 + \sum_{Lower\_channel}|FFT(r(n))|^2}{\sum_{Transmit\_channel}|FFT(r(n))|^2} \qquad \text{[Equation 3]}$$

$$l_3(\theta) = \frac{1}{2N}\sum_{n=0}^{N-1}|\hat{x}(n) - x(n)|^2 \qquad \text{[Equation 4]}$$

However, since the NN applied in the time domain operates similarly to a time-domain filter, the NN may modify the characteristics of frequency-domain signals and cause interference in adjacent bands or resources. As a result, the NN may be a factor contributing to performance degradation (see $l_2(\theta)$ in FIG. 9).

Herein, a method of generating pilot signals and data signals by applying an NN to optimize a BER in consideration of a PAPR will be described.

First, a PAPR variation will be described based on a PAPR margin and a pilot signal, and then a pilot signal design method proposed in the present disclosure will be explained.

A. Variation of PAPR Margin Depending on Distance Between UE and BS

For efficient signal transmission, a transmitted signal needs to exist within the linear region of a power amplifier. This means that the peak of the transmitted signal needs to be within the linear region of the power amplifier. Therefore, assuming the same power amplifier, if the difference between the peak and average power of the signal is large, the average power needs to be reduced compared to cases where the difference between the peak and average power of the signal is small. The difference between the peak and average power may be expressed as the PAPR. The PAPR represents the ratio of the peak of the signal to the average power thereof. For example, if the average power is 0 dB and the peak is 10 dB, the PAPR may be 10 dB.

Figure 9:
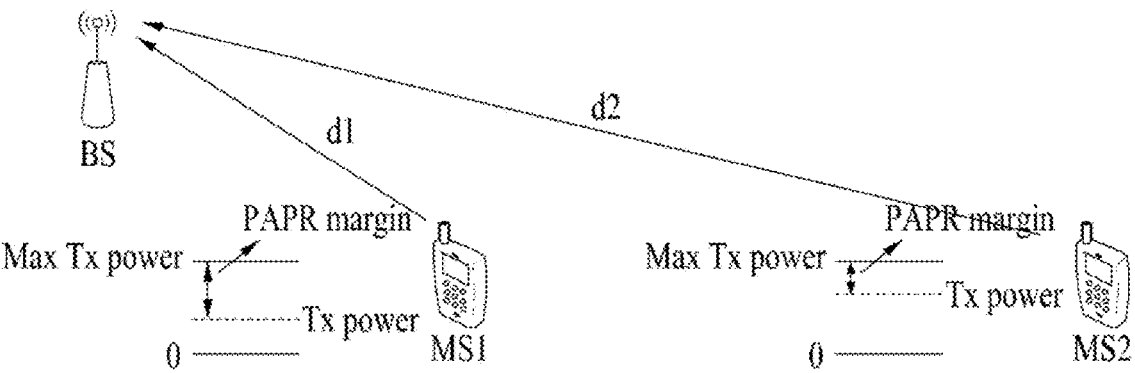
FIG. 9 illustrates a PAPR margin.

The PAPR margin refers to a PAPR value that ensures the linearity of the power amplifier based on the currently required transmit (Tx) power. When a DC signal with a PAPR of 0 dB is transmitted, the currently required Tx power becomes the maximum power required for signal transmission. In this case, the ratio (or difference) between the maximum Tx power of the transmitter and the currently required Tx power (for the transmitted signal) is considered as the PAPR margin. The transmitted signal needs to have a PAPR value smaller than the PAPR margin to operate within the linear region of the power amplifier. FIG. 9 illustrates the variation of a PAPR margin with respect to required Tx power. As the PAPR margin decreases, the PAPR value of the signal needs to also decrease to mitigate performance degradation due to the PAPR.

B. Variation of PAPR Depending on Pilot Signal

Figure 10:
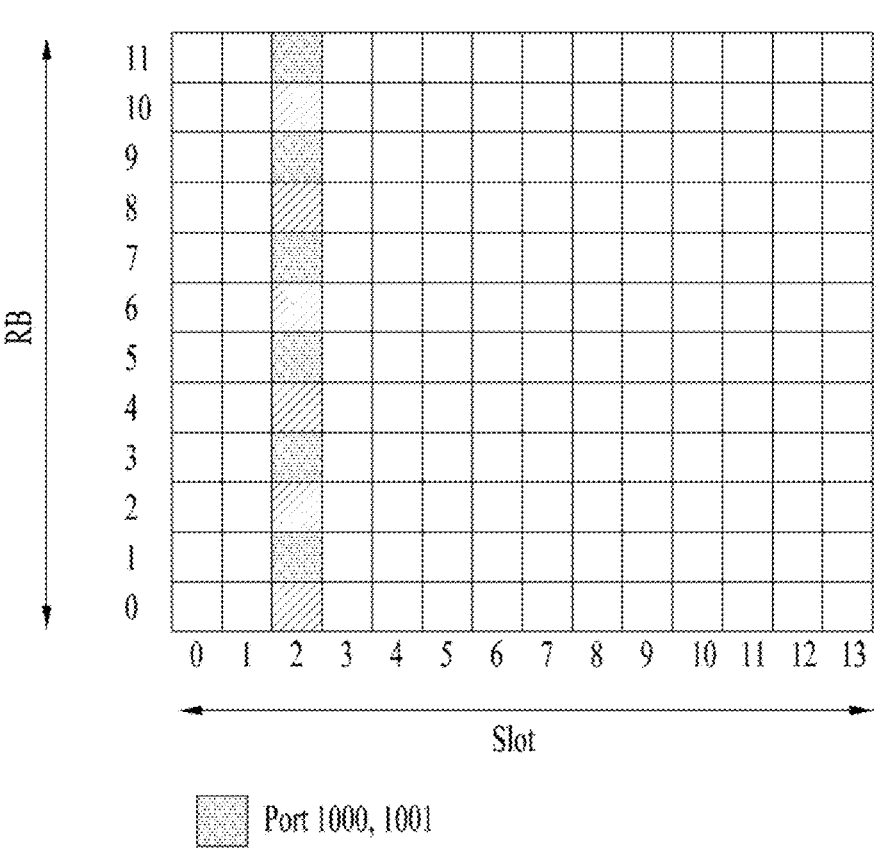
FIG. 10 illustrates a reference signal structure.

A pilot signal or reference signal (RS) is a known signal transmitted for channel estimation in communication systems. FIG. 10 illustrates the structure of an RS. The RS may be transmitted independently or multiplexed with data (e.g., PDSCH, PUSCH, etc.) on radio resources (e.g., RB). For example, the RS and data may be multiplexed based on time division multiplexing (TDM), while the RS may be multiplexed between antenna ports based on frequency division multiplexing (FDM). Although not shown, the RS and data may be multiplexed based on TDM/FDM and combinations thereof. In addition, the RS may be multiplexed between antenna ports based on FDM/TDM/CDM (code division multiplexing) and combinations thereof.

In the OFDM system, data and pilot signals allocated in the frequency domain pass through the IFFT and are then transmitted in an overlapped form in the time domain. Therefore, a radio signal is expressed as the sum of the data and pilot signals. In addition, the PAPR of the radio signal is determined according to the types of the data and pilot signals. However, data signals are unknown signals and may not be arbitrarily modified. In contrast, pilot signals are known signals and may be transmitted in various forms as needed. Therefore, the performance of the system may be improved by appropriately designing pilot signals according to the requirements.

For instance, when the PAPR of a pilot signal is designed to be 0 dB (the minimum possible value for the PAPR) in a state that the PAPR of a data signal is fixed at a specific value, the PAPR of the entire signal may be reduced by adjusting the power ratio between the data signal and the pilot signal in the total power. However, if the ratio of the pilot signal increases excessively to reduce the PAPR, it may result in a decrease in the Tx power of the data signal, leading to degradation in BER performance, which is the final performance metric. Therefore, pilot signals need to be designed considering not only the PAPR but also the BER.

C. Design of Pilot Signal in Consideration of BER and PAPR

Figure 11:
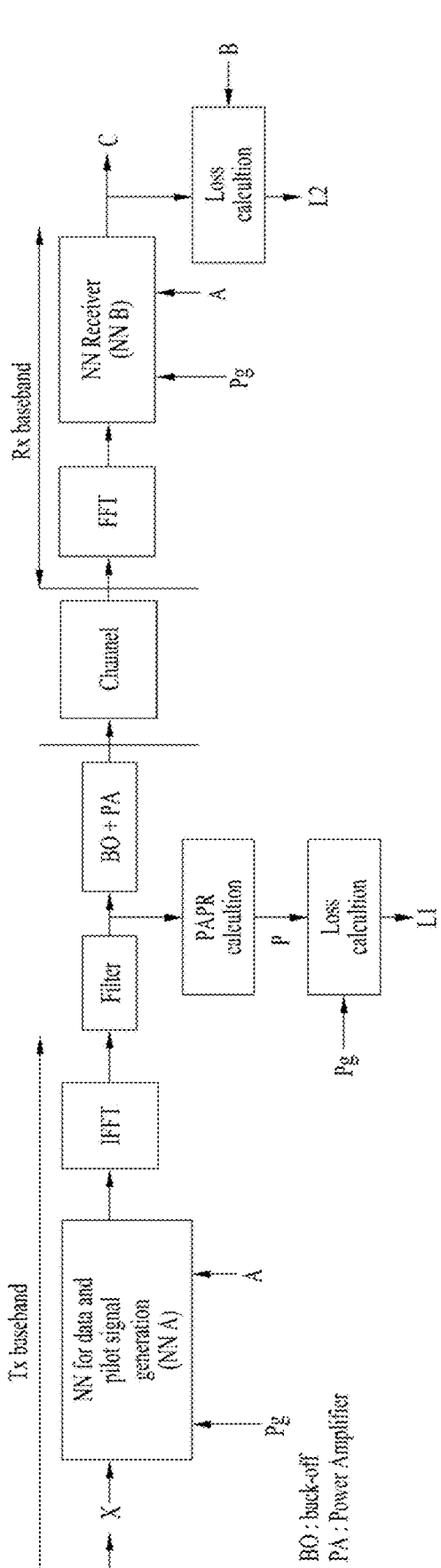
FIG. 11 illustrates a PAPR reduction method according to an example of the present disclosure.

FIG. 11 illustrates an exemplary communication system to which an NN is applied according to an embodiment of the present disclosure. The system shown in FIG. 11 may be used to design a pilot signal in consideration of both the BER and PAPR.

Referring to FIG. 11, a transmitter may include NN A before an IFFT end. NN A may include one input layer, one or more FC layers, and one output layer. In the transmitter, NN A is used to generate data and pilot signals. For example, in the transmitter, NN A may receive a modulation data signal X (e.g., quadrature amplitude modulation (QAM)) and information A for pilot signal generation, and output a frequency-domain symbol. For example, the information A for pilot signal generation may include at least one of a device ID (e.g., UE ID, BS ID, etc.), time information (e.g., slot number, OFDM symbol number, etc.), information on a base sequence (e.g., root index, cyclic shift, etc.), and base sequence hopping information. The input/output unit/size of NN A may correspond to time resources (e.g., slot, OFDM symbol, etc.). In this case, NN A may be provided with a PAPR margin Pg as an input to enable NN A to generate an appropriate signal according to the PAPR margin. IFFT may be performed on the frequency-domain symbol outputted from NN A on an OFDM symbol basis, and then the frequency-domain symbol may be transmitted to a receiver after filtering/power amplification, etc.

In accordance with the configuration of the transmitter, the receiver may include NN B after an FFT end. NN B may include one input layer, one or more FC layers, and one output layer. In the receiver, NN B is used to restore data and pilot signals. For example, in the receiver, NN B may receive information A for generating a pilot signal, and a FFTed time-domain signal, and output a modulated data symbol. The input/output unit/size of NN B may correspond to time resources (e.g., slot, OFDM symbol, etc.). The output modulated data symbol may be converted into decoded bits C through a demodulation/decoding process. Similarly to the transmitter, NN B may be provided with a PAPR margin Pg as an input to enable NN B to generate an appropriate signal based on the PAPR margin. To enable NN A and NN B to operate based on the same PAPR margin information, the transmitter may share the current PAPR margin information with the receiver.

The NN-based communication system in FIG. 11 operates on an end-to-end learning basis. The transmitter may compute a PAPR P of the generated signal and calculate a PAPR-related loss L1 based on the difference between the PAPR P and the PAPR margin (or target PAPR) Pg. The receiver may calculate a BER-related loss L2 based on the difference between original bits B and restored bits C. To implement a system that operates with various PAPR margin values, the NNs in the transmitter and receiver may be trained with a specific PAPR margin Pg, which is fixed. Alternatively, the NNs in the transmitter and receiver may be trained while changing the PAPR margin Pg.

A system loss L in FIG. 11 may be expressed as follows.

$$L = L2 + \rho L1 \qquad \text{[Equation 5]}$$

In Equation 5, $\rho$ represents a hyperparameter. The minimum value of $\rho$ is 0, and preferably, $\rho$ represents a nonzero positive real number. L1 represents the PAPR-related loss, and L2 represents the BER-related loss. L1 and L2 may be expressed as follows:

$$L1 = |P - Pg| \qquad \text{[Equation 6]}$$

In Equation 6, P represents the measured PAPR, and Pg represents the PAPR margin (or target PAPR).

$$L2 = \frac{1}{2N} \sum_{n=0}^{N-1} |C(n) - B(n)|^2 \qquad \text{[Equation 7]}$$

In Equation 7, B represents the original bits, C represents the restored bits, and N represents the number of bits.

After completion of training, during data communication, an appropriate PAPR margin Pg may be applied as an input to the NNs in the transmitter and receiver to perform transmission and reception operations accordingly. Therefore, to enable NN A and NN B to operate based on the same PAPR margin information during data transmission, the transmitter may share the current PAPR margin information with the receiver.

In the communication system of FIG. 11, since the pilot and data signal are generated to optimize the BER by considering the PAPR in the frequency domain (that is, NN A is located before the IFFT end), the pilot and data signal may have no time-domain filtering effects. Therefore, the pilot and data signals may maintain the signal frequency characteristics and may not affect adjacent bands or resources.

FIG. 12 illustrates an exemplary wireless signal transmission method according to the present disclosure. Referring to FIG. 12, a transmitting device may input (1) a data modulation symbol, (2) information for generating a reference signal sequence, and (3) PAPR margin information into an artificial NN, whereby outputting a complex sequence in a frequency domain through the artificial NN (S1202). Thereafter, the transmitting device may generate an OFDM symbol by applying an inverse Fourier transformation to the complex sequence (S1204) and transmit the OFDM symbol (S1206). In this case, the input/output unit of the artificial NN may correspond to a time resource unit (e.g., slot, OFDM symbol, etc.) for data transmission.

The PAPR margin information may include a ratio of (i) maximum Tx power of the transmitting device to (ii) Tx power required for signal transmission. The PAPR margin information may be shared with a receiving device. A loss function used in training of the artificial neural network may include the following: $L=L2+\rho L1$, where $\rho$ represents a hyperparameter, L1 represents a PAPR-related loss, and L2 represents a BER-related loss. In this case, $\rho$ is a positive number including 0, and 0 may be excluded depending on the implementation method.

The various descriptions, functions, procedures, proposals, methods, and/or operational flowcharts proposals of the disclosure described above in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

In the disclosure, the at least one memory (e.g., 104 or 204) may store instructions or programs, and the instructions or programs may cause, when executed, at least one processor operably connected to the at least one memory to perform operations according to some embodiments or implementations of the disclosure.

In the disclosure, a computer readable storage medium may store at least one instruction or program, and the at least one instruction or program may cause, when executed by at least one processor, the at least one processor to perform operations according to some embodiments or implementations of the disclosure.

In the disclosure, a computer program may be recorded in at least one computer-readable (non-volatile) storage medium, and may include a program code that causes (at least one processor) to perform an operation when being executed according to some embodiments or implements of the disclosure. The computer program may be provided in the form of a computer program product. The computer program product may include at least one computer readable (non-volatile) storage medium, and the computer readable storage medium may include a program code that causes (at least one processor) to perform an operation when being executed according to some embodiments or implements of the disclosure.

In the disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the disclosure.

A communication device of the disclosure includes at least one processor; and at least one computer memory operably connected to the at least one processor and configured to store instructions for causing, when executed, the at least one processor to perform operations according to example(s) of the disclosure described later.

FIG. 13 illustrates a communication system 1 applied to the disclosure.

Referring to FIG. 13, a communication system 1 applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Figure 14:
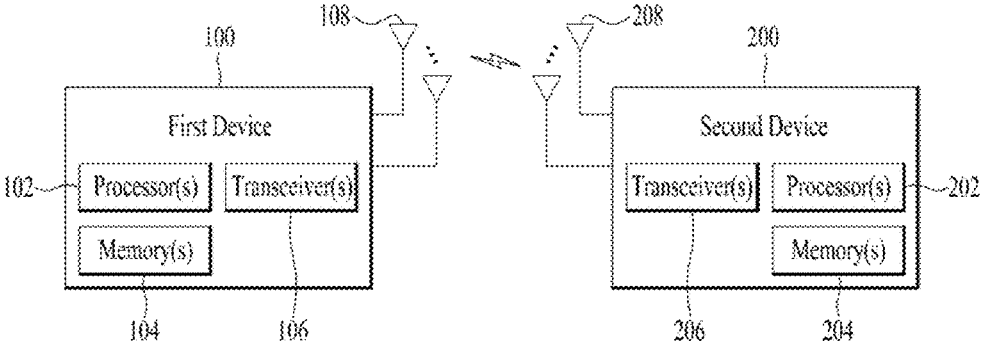

FIG. 14 illustrates wireless devices applicable to the disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s)

102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
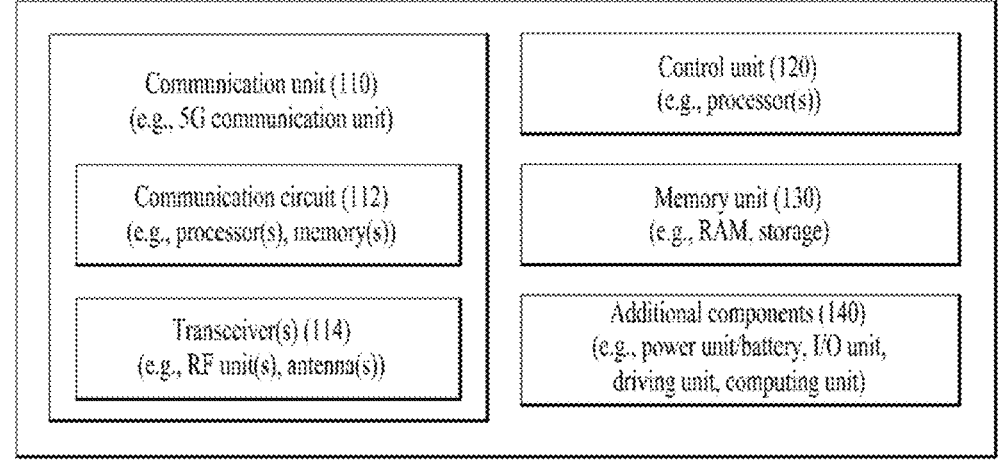

FIG. 15 illustrates another example of a wireless device applied to the disclosure. The wireless device may be implemented in various forms according to a use-case/service (refer to FIG. 13).

Referring to FIG. 15, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 16:
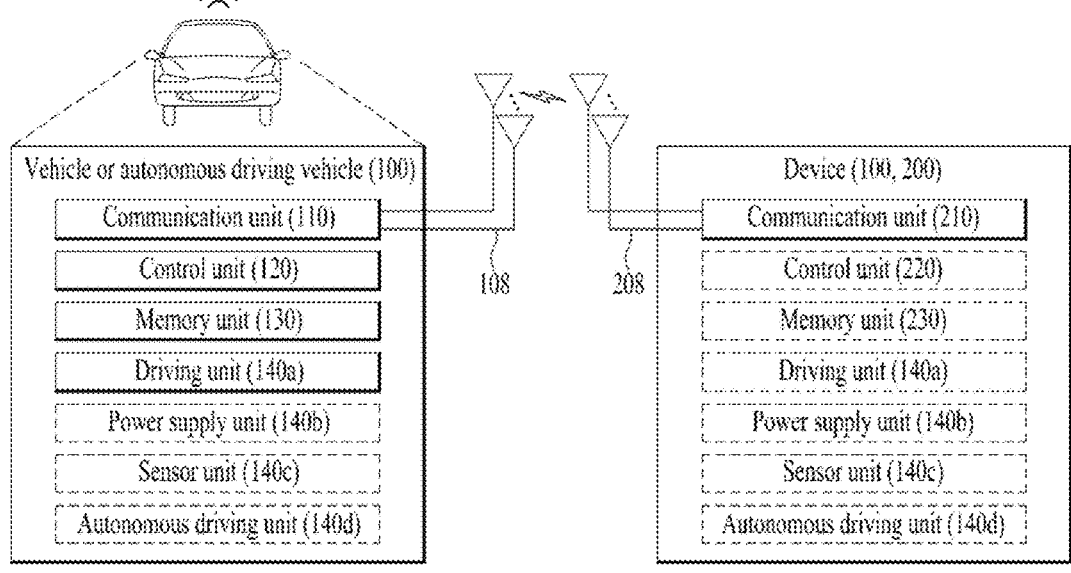

FIG. 16 illustrates a vehicle or an autonomous driving vehicle applied to the disclosure. The vehicle or autonomous driving vehicle may be implemented by a mobile robot, a car, a train, a manned/unmanned Aerial Vehicle (AV), a ship, etc.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the disclosure in prescribed forms. And, the respective elements or features may be considered as selective unless they are explicitly mentioned. Each of the elements or features may be implemented in a form failing to be combined with other elements or features. Moreover, it is able to implement an embodiment of the disclosure by combining elements and/or features together in part. A sequence of operations explained for each embodiment of the disclosure may be modified. Some configurations or features of one embodiment may be included in another embodiment or may be substituted for corresponding configurations or features of another embodiment. And, it is apparently understandable that an embodiment is configured by combining claims failing to have relation of explicit citation in the appended claims together or may be included as new claims by amendment after filing an application.

Those skilled in the art will appreciate that the disclosure may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The disclosure is applicable to UEs, eNBs or other apparatuses of a wireless mobile communication system.

The invention claimed is:

1. A method performed by a transmitting device, the method comprising:
   inputting (1) a data modulation symbol, (2) information regarding a reference signal sequence generation, and (3) peak-to-average power ratio (PAPR) margin information into an artificial neural network, to output a complex sequence in a frequency domain through the artificial neural network;
   generating an orthogonal frequency division multiplexing (OFDM) symbol based on an inverse Fourier transformation to the complex sequence; and
   transmitting the OFDM symbol,
   wherein the PAPR margin information is shared with a receiving device.

2. The method of claim 1, wherein the PAPR margin information includes a ratio of (i) maximum transmit (Tx) power of the transmitting device to (ii) Tx power required for signal transmission.

3. The method of claim 1, wherein a loss function used in training of the artificial neural network includes the following:

$$L = L2 + \rho L1,$$

where $\rho$ represents a hyperparameter, L1 represents a PAPR-related loss, and L2 represents a bit error rate related (BER-related) loss.

4. The method of claim 3, wherein $\rho$ is a positive value.

5. An apparatus for a transmitting device, the apparatus comprising:
   at least one processor; and
   at least one computer memory operably connected to the at least one processor and configured to, when executed, cause the at least one processor to perform operations comprising:
   inputting (1) a data modulation symbol, (2) information regarding a reference signal sequence generation, and (3) peak-to-average power ratio (PAPR) margin information into an artificial neural network, to output a complex sequence in a frequency domain through the artificial neural network;
   generating an orthogonal frequency division multiplexing (OFDM) symbol by based on an inverse Fourier transformation to the complex sequence; and
   transmitting the OFDM symbol,
   wherein the PAPR margin information is shared with a receiving device.

6. The apparatus of claim 5, wherein the PAPR margin information includes a ratio of (i) maximum transmit (Tx) power of the transmitting device to (ii) Tx power required for signal transmission.

7. The apparatus of claim 5, wherein a loss function used in training of the artificial neural network includes the following:

$$L = L2 + \rho L1,$$

where $\rho$ represents a hyperparameter, L1 represents a PAPR-related loss, and L2 represents a bit error rate related (BER-related) loss.

8. The apparatus of claim 7, wherein p is a positive value.

9. A receiving device comprising:

at least one radio frequency (RF) unit;

at least one processor; and at least one computer memory operably connected to the at least one processor and configured to, when executed, cause the at least one processor to perform operations comprising:

receiving an orthogonal frequency division multiplexing (OFDM) symbol;

generating a complex sequence in a frequency domain based on a Fourier transformation to the OFDM symbol; and inputting (1) the complex sequence, (2) information for generating a reference signal sequence, and (3) peak-to-average power ratio (PAPR) margin information into an artificial neural network, to output a data modulation symbol through the artificial neural network, wherein the PAPR margin information is shared with a transmitting device.

10. The receiving device of claim 9, wherein the PAPR margin information includes a ratio of (i) maximum transmit (Tx) power of the transmitting device to (ii) Tx power required for signal transmission.

11. The receiving device of claim 9, wherein a loss function used in training of the artificial neural network includes the following:

$$L = L2 + \rho L1,$$

where $\rho$ represents a hyperparameter, L1 represents a PAPR-related loss, and L2 represents a bit error rate related (BER-related) loss.

12. The receiving device of claim 11, wherein p is a positive value.

\* \* \* \* \*